US011373650B2

(12) United States Patent
Suzuki et al.

(10) Patent No.: US 11,373,650 B2
(45) Date of Patent: Jun. 28, 2022

(54) INFORMATION PROCESSING DEVICE AND INFORMATION PROCESSING METHOD

(71) Applicant: SONY CORPORATION, Tokyo (JP)

(72) Inventors: Seiji Suzuki, Kanagawa (JP); Kentaro Ida, Tokyo (JP)

(73) Assignee: SONY CORPORATION, Tokyo (JP)

( * ) Notice: Subject to any disclaimer, the term of this patent is extended or adjusted under 35 U.S.C. 154(b) by 11 days.

(21) Appl. No.: 16/754,706

(22) PCT Filed: Sep. 4, 2018

(86) PCT No.: PCT/JP2018/032698
§ 371 (c)(1),
(2) Date: Apr. 8, 2020

(87) PCT Pub. No.: WO2019/077897
PCT Pub. Date: Apr. 25, 2019

(65) Prior Publication Data
US 2020/0258515 A1    Aug. 13, 2020

(30) Foreign Application Priority Data

Oct. 17, 2017   (JP) .............................. JP2017-200991

(51) Int. Cl.
*G10L 15/22*       (2006.01)
*G06F 3/14*        (2006.01)
(Continued)

(52) U.S. Cl.
CPC ............... *G10L 15/22* (2013.01); *G06F 3/14* (2013.01); *G06F 3/167* (2013.01); *G10L 15/19* (2013.01); *G10L 2015/223* (2013.01)

(58) Field of Classification Search
USPC ..................................................... 704/1–504
See application file for complete search history.

(56) References Cited

U.S. PATENT DOCUMENTS 9,720,644 B2 *   8/2017   Ohmura .................. G10L 15/26
10,089,981 B1 *  10/2018  Elangovan .............. G10L 15/22
(Continued)

FOREIGN PATENT DOCUMENTS

CN       102749990 A    10/2012
EP        2523069 A2    11/2012
(Continued)

OTHER PUBLICATIONS

International Search Report and Written Opinion of PCT Application No. PCT/JP2018/032698, dated Nov. 13, 2018, 09 pages of ISRWO.

*Primary Examiner* — Marcus T Riley
(74) *Attorney, Agent, or Firm* — Chip Law Group

(57) ABSTRACT

[Problem] Provided are an information processing device, an information processing method, and a program which are capable of giving an instruction for control relating to a location in a space even in voice utterance that does not include the name of a specific location. [Solution] The information processing device includes a control unit that acquires voice utterance corresponding to a processing command of control relating to a location in a space, determines the location in the space in the processing command on the basis of a result of environment sensing processing of the space by a plurality of kinds of sensors in a case where the acquired voice utterance does not include a word that specifies the location in the space, and performs control of issuing a processing command of control relating to the location in the space on the basis of the determined location.

10 Claims, 9 Drawing Sheets

(51) Int. Cl.
*G06F 3/16* (2006.01)
*G10L 15/19* (2013.01)

(56) References Cited

U.S. PATENT DOCUMENTS

| | | | | |
|---|---|---|---|---|
| 10,223,066 | B2* | 3/2019 | Martel | G10L 15/26 |
| 10,335,572 | B1* | 7/2019 | Kumar | G06F 3/013 |
| 10,446,143 | B2* | 10/2019 | Akbacak | G10L 15/08 |
| 10,492,981 | B1* | 12/2019 | Kumar | A61H 19/44 |
| 10,672,379 | B1* | 6/2020 | Eilert | G06F 3/162 |
| 10,699,706 | B1* | 6/2020 | Jayavel | G10L 15/1822 |
| 10,916,243 | B2* | 2/2021 | Devaraj | H04L 51/24 |
| 10,942,703 | B2* | 3/2021 | Martel | G10L 15/22 |
| 11,100,922 | B1* | 8/2021 | Mutagi | G06F 3/167 |
| 2004/0193413 | A1* | 9/2004 | Wilson | H04N 13/239 |
| | | | | 382/209 |
| 2005/0134117 | A1* | 6/2005 | Ito | G06F 3/017 |
| | | | | 307/10.1 |
| 2012/0257035 | A1* | 10/2012 | Larsen | G06F 3/017 |
| | | | | 348/78 |
| 2014/0303975 | A1* | 10/2014 | Ohmura | G10L 15/22 |
| | | | | 704/235 |
| 2014/0304605 | A1* | 10/2014 | Ohmura | G06F 3/167 |
| | | | | 715/728 |
| 2014/0304606 | A1* | 10/2014 | Ohmura | G06F 3/167 |
| | | | | 715/728 |
| 2018/0182389 | A1* | 6/2018 | Devaraj | H04L 51/046 |
| 2019/0362557 | A1* | 11/2019 | Lacey | G06F 3/012 |
| 2020/0258515 | A1* | 8/2020 | Suzuki | G06F 3/14 |
| 2021/0174795 | A1* | 6/2021 | Robert Jose | G06F 3/165 |
| 2021/0210094 | A1* | 7/2021 | Devaraj | G10L 17/06 |

FOREIGN PATENT DOCUMENTS

| | | |
|---|---|---|
| JP | 2002-175540 A | 6/2002 |
| JP | 2004-192653 A | 7/2004 |
| JP | 2005-178473 A | 7/2005 |
| JP | 2012-221498 A | 11/2012 |
| JP | 2014-164373 A | 9/2014 |
| JP | 2016-009214 A | 1/2016 |
| JP | 2016-053769 A | 4/2016 |

* cited by examiner

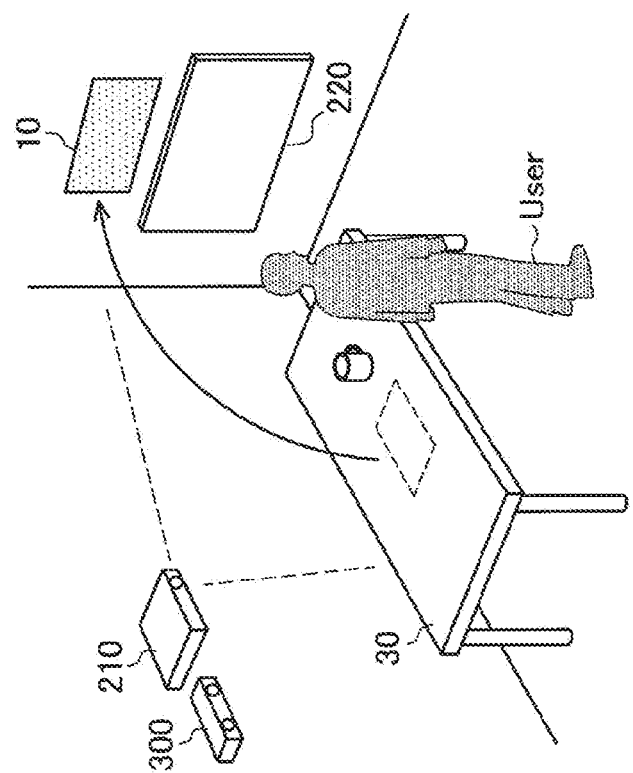
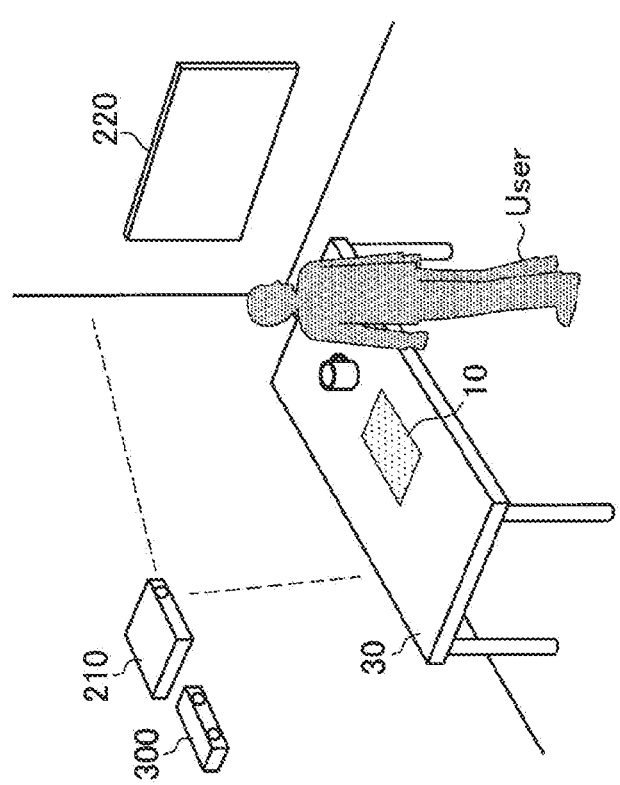
FIG.7

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/032698 filed on Sep. 4, 2018, which claims priority benefit of Japanese Patent Application No. JP 2017-200991 filed in the Japan Patent Office on Oct. 17, 2017. Each of the above-referenced applications is hereby incorporated herein by reference in its entirety.

FIELD

The present disclosure relates to an information processing device, an information processing method, and a program.

BACKGROUND

Recently, various display apparatuses including a fixed type display apparatus such as a television receiver (hereinafter, simply referred to as "TV") and a projector, and a mobile type display apparatus such as a smart phone and a notebook personal computer (PC) have been developed. In addition, along with development of the display apparatuses, interfaces and operation methods for controlling devices are diversified.

For example, Patent Literature 1 below discloses a configuration in which display contents are projected to a wall surface, an operation corresponding to a gesture of a user with respect to a projection surface such as a gesture recognized from a posture of an arm and a hand of the user, for example, a pointing operation of designating a position is detected, and a cursor is displayed at a position designated by the pointing operation.

In addition, Patent Literature 2 below discloses control in which a position of a user with respect to a large display provided on a wall surface or a table is estimated, and a new display object is displayed in the vicinity of the user in correspondence with the estimated position of the user.

In addition, Patent Literature 3 below discloses a multimodal dialogue system that performs an interaction with a user through various input/output devices.

CITATION LIST

Patent Literature

Patent Literature 1: JP 2016-53769 A
Patent Literature 2: JP 2016-9214 A
Patent Literature 3: JP 2004-192653 A

SUMMARY

Technical Problem

However, in the above Patent Literature 1 and Patent Literature 2, a display position of a user interface (UI) is controlled by a gesture such as pointing by a user or a single modal such as a position of the user, and thus it is difficult to give an instruction with a natural way of speaking such as a dialogue between human beings.

In addition, in Patent Literature 3, a display position of image information of an anthropomorphized agent person is determined by the multimodal, but no consideration is given to a case where determination information cannot be extracted from a processing command uttered by a voice.

Here, in the present disclosure, there are suggested an information processing device, an information processing method, and a program which are capable of giving an instruction for control relating to a location in a space even in voice utterance that does not include the name of a specific location.

Solution to Problem

According to the present disclosure, an information processing device is provided that includes: a control unit that acquires voice utterance corresponding to a processing command of control relating to a location in a space, determines the location in the space in the processing command on the basis of a result of environment sensing processing of the space by a plurality of kinds of sensors in a case where the acquired voice utterance does not include a word that specifies the location in the space, and performs control of issuing a processing command of control relating to the location in the space on the basis of the determined location.

According to the present disclosure, an information processing method is provided that is executed by a processor, the method includes: acquiring voice utterance corresponding to a processing command of control relating to a location in a space; determining the location in the space in the processing command on the basis of a result of environment sensing processing of the space by a plurality of kinds of sensors in a case where the acquired voice utterance does not include a word that specifies the location in the space; and performing control of issuing a processing command of control relating to the location in the space on the basis of the determined location.

According to the present disclosure, a program is provided that causes a computer to function as a control unit that acquires voice utterance corresponding to a processing command of control relating to a location in a space, determines the location in the space in the processing command on the basis of a result of environment sensing processing of the space by a plurality of kinds of sensors in a case where the acquired voice utterance does not include a word that specifies the location in the space, and performs control of issuing a processing command of control relating to the location in the space on the basis of the determined location.

Advantageous Effects of Invention

As described above, according to the present disclosure, even in voice utterance that does not include the name of a specific location, it is possible to give an instruction for control relating to a location in a space.

Note that, the above-described effect is not limited, and any one effect described in this specification or other effects that can be understood from this specification may be exhibited in combination of the above-described effect or instead of the above-described effect.

BRIEF DESCRIPTION OF DRAWINGS

FIG. 7 is a view illustrating an example of movement of a display image through issuing of a MOVE command according to this embodiment.

DESCRIPTION OF EMBODIMENTS

Figure 1:
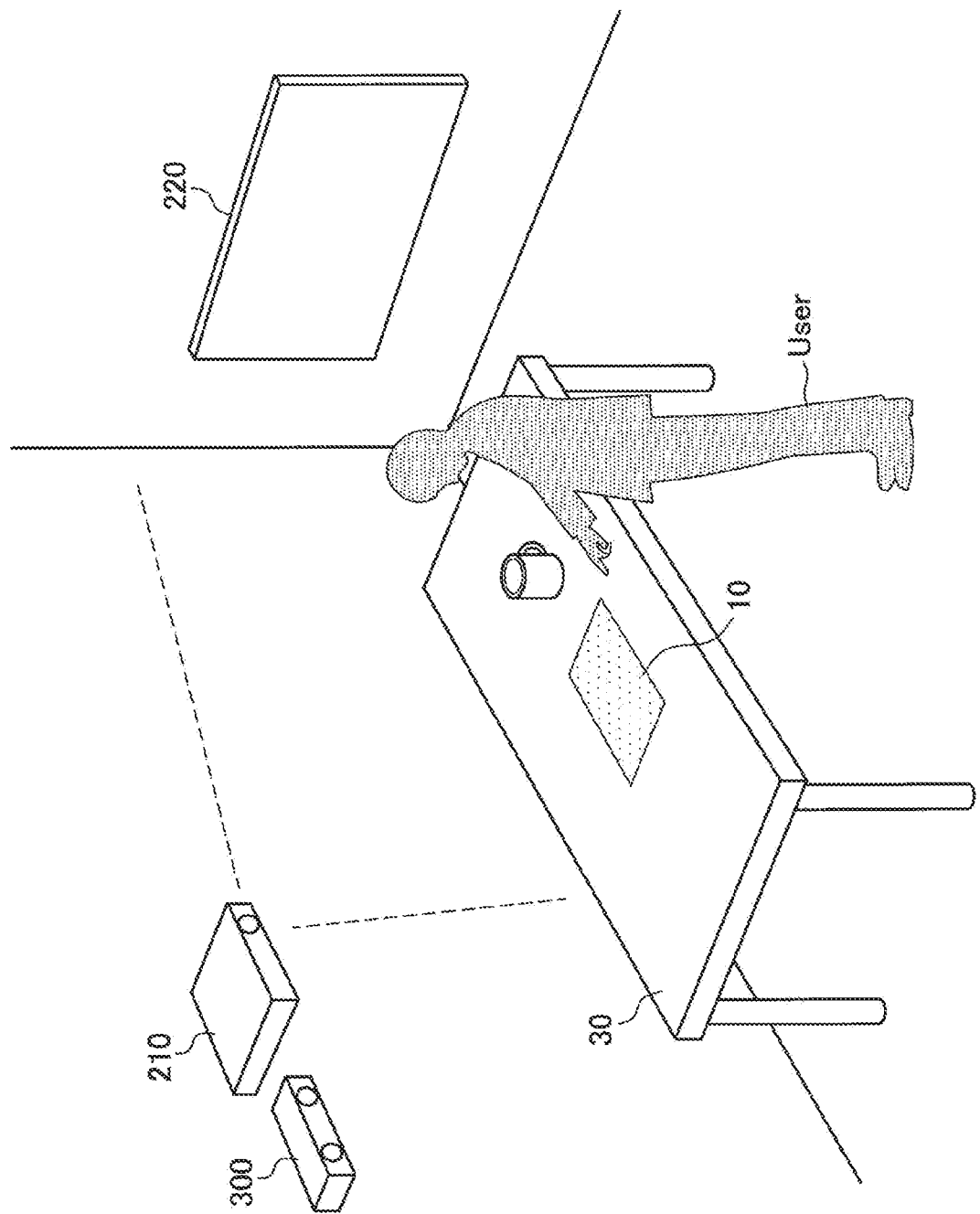
FIG. 1 is a view describing an overview of an information processing system according to an embodiment of the present disclosure.

Hereinafter, a preferred embodiment of the present disclosure will be described in detail with reference to the accompanying drawings. Note that, in this specification and the drawings, the same reference numeral will be given to a constituent element having substantially the same functional configuration, and redundant description thereof will be omitted.

In addition, description will be given in the following order.

1. Overview of Information Processing System of Embodiment of Present Disclosure
2. Configuration Example
2-1. Output Device 200
2-2. Sensor Device 300
2-3. Information Processing Device 100
3. Operation Processing
4. Modification Example
5. Hardware Configuration
6. Summary

1. Overview of Information Processing System of Embodiment of Present Disclosure FIG. 1 is a view describing an overview of an information processing system according to an embodiment of the present disclosure. The information processing system according to this embodiment includes an information processing device 100 (not illustrated in FIG. 1), an output device 200 (in FIG. 1, a projector 210 and a TV 220 are illustrated as an example), and a sensor device 300.

The sensor device 300 is a device that senses various pieces of information. For example, the sensor device 300 includes a camera, a depth sensor, a microphone, and the like, and senses information relating to a user, and a space in which the user exists. For example, the sensor device 300 senses a position, a posture, movement, and a line of sight of a user, a chamber shape, furniture arrangement, and the like.

The output device 200 is a device that outputs various pieces of information transmitted from the information processing device 100, and for example, the projector 210 or the TV 220 are assumed. The projector 210 can project information in a state in which an arbitrary location (that is, a region) such as a wall, a floor, a table, or other furniture which is contained in the space that is sensed by the sensor device 300 is set as a projection location (that is, a projection surface or a projection region). Note that, the projection location is not limited to a plane, and may be a curved surface or may be divided into a plurality of surfaces. In addition, the projector 210 is realized by a plurality of projectors or a so-called moving projector so that the projector can perform projection anywhere in the space.

The output device 200 and the sensor device 300 may be provided one by one, or a plurality of the output devices 200 and a plurality of the sensor devices 300 may be provided.

In an example illustrated in FIG. 1, a display image 10 is displayed on a top surface of a table 30 by the projector 210. The display image 10 is a display object indicating an interaction from an application with respect to a user's input, and examples thereof include various UIs such as a still image, a moving image (video), a menu screen, and a control screen.

An operation input by the user with respect to the display image 10 is detected by the sensor device 300, and thus the user can perform various kinds of operation input with respect to the display image 10 by causing an operating body, for example, a hand to come in contact with or to approach the display image 10.

A display position of the display image 10 may be an arbitrary location such as a wall, a floor, and furniture in a space without limitation to the top surface of the table 30, and is controlled automatically or in accordance with an instruction from a user.

Here, in a case where control of the display position is performed by a single modal, for example, it is necessary for a user to clearly indicate a location of the display position with speech, and it is difficult to give an instruction with a natural way of speaking such as a dialogue between human beings.

Here, in the present disclosure, there is suggested a mechanism capable of giving an instruction for control relating to a location in a space even in voice utterance that does not include the name of a specific location.

2. Configuration Example

Figure 2:
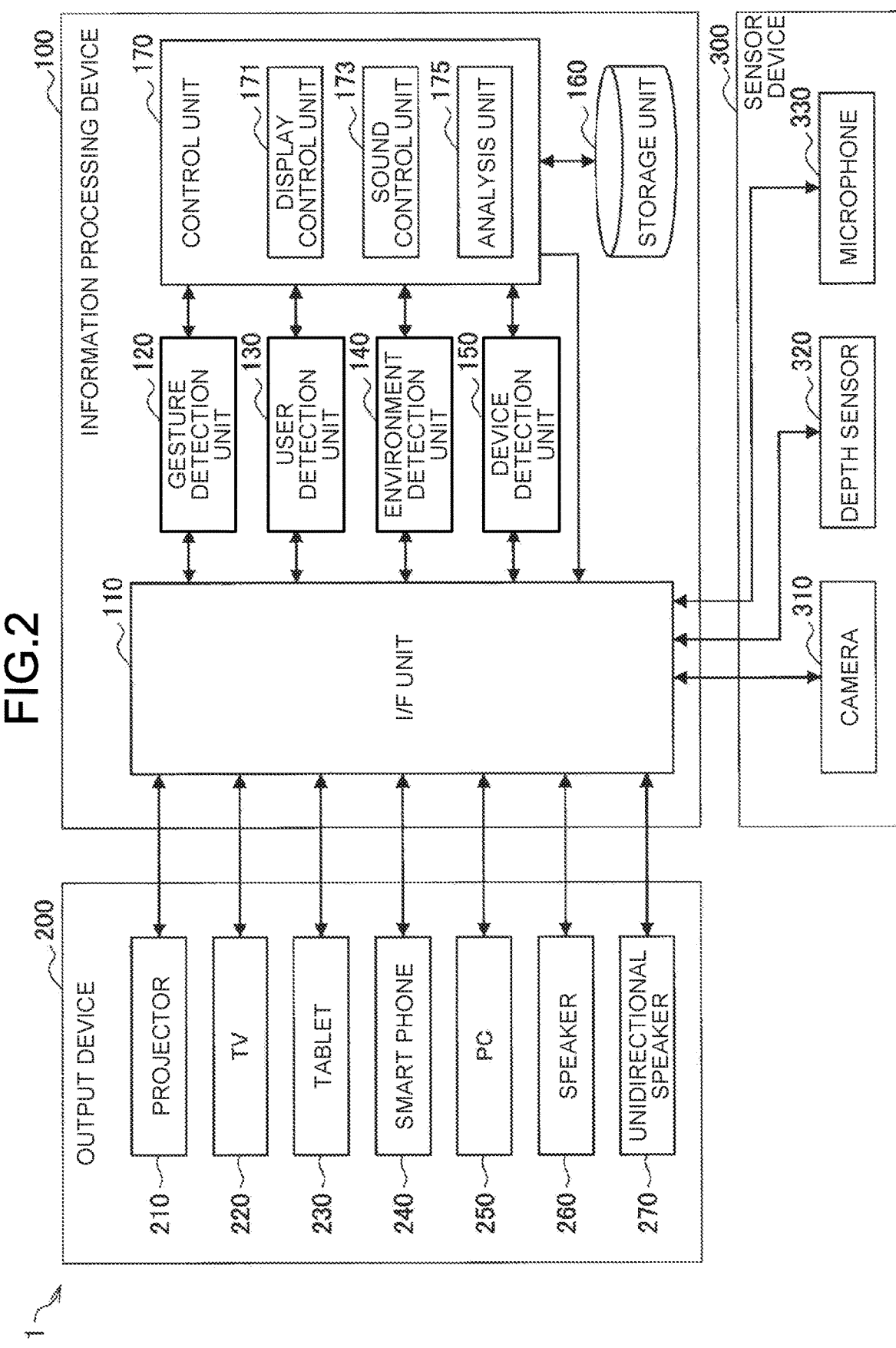
FIG. 2 is a block diagram illustrating an example of a configuration of the information processing system according to this embodiment.

FIG. 2 is a block diagram illustrating an example of a configuration of a system 1 according to this embodiment. As illustrated in FIG. 2, the system 1 includes the information processing device 100, the output device 200, and the sensor device 300.

<2-1. Output Device 200>

The output device 200 includes a projector 210, a TV 220, a tablet 230, a smart phone 240, a PC 250, a speaker 260, and a unidirectional speaker 270. Note that, the system 1 may include one or a combination of a plurality of the devices as the output device 200, or may include a plurality of the same kind of devices.

The projector 210 is a projection device that projects an image to an arbitrary location in a space. For example, the projector 210 may be a fixed-type wide-angle projector, or a so-called moving projector including a movable part such as a pan/tilt drive type capable of changing a projection direction. The TV 220 is a device that receives radio waves such as television broadcasting and outputs an image and a voice. Typically, the tablet 230 is a mobile device that has a screen larger than that of the smart phone 240 and is capable of performing radio communication, and can output an image, a voice, vibration, and the like. Typically, the smart phone 240 is a mobile device that has a screen smaller than that of the tablet 230 and is capable of performing radio communication, and can output an image, a voice, vibration, and the like. The PC 250 may be a fixed type desktop PC or a mobile type notebook PC, and can output an image, a voice, and the like. The speaker 260 converts voice data into an analog signal through a digital analog converter (DAC) and an amplifier and outputs (reproduces) the analog signal. The unidirectional speaker 270 is a speaker that can form directivity in a single direction.

The output device 200 outputs information on the basis of control by the information processing device 100. The information processing device 100 can also control an output method in addition to the content of the output information. For example, the information processing device 100 can control a projection direction of the projector 210, or can control directivity of the unidirectional speaker 270.

Note that, the output device 200 may include a constituent element capable of performing arbitrary outputting in addition to the above-described constituent elements. For example, the output device 200 may include a wearable device such as a head mounted display (HMD), an augmented reality (AR) glass and a timepiece-type device.

In addition, the output device 200 may include an illumination device, an air conditioning device, a voice reproduction device, or the like.

<2-2. Sensor Device 300>

The sensor device 300 includes a camera 310, a depth sensor 320, and a microphone 330.

The camera 310 is an image capturing device such as an RGB camera that includes a lens system, a drive system, and an image capturing element, and captures an image (a still image or a moving image). The depth sensor 320 is a device such as an infrared distance measurement device, an ultrasonic distance measurement device, laser imaging detection and ranging (LiDAR), or a stereo camera which acquires depth information. The microphone 330 is a device that collects nearby sounds, and outputs voice data converted into a digital signal through an amplifier and an analog digital converter (ADC). The microphone 330 may be an array microphone.

The sensor device 300 senses information on the basis of control by the information processing device 100. For example, the information processing device 100 can control a zoom lens and an image capturing direction of the camera 310.

Note that, the sensor device 300 may include a constituent element capable of performing arbitrary sensing in addition to the above-described constituent elements. For example, the sensor device 300 may include a device such as a mouse, a keyboard, a touch panel, a button, a switch, and a lever which are operated by a user to input information. In addition, the sensor device 300 may include various sensors such as an acceleration sensor, a gyro sensor, a geomagnetic sensor, an optical sensor, an illuminance sensor, a force sensor, an ultrasonic sensor, a barometric pressure sensor, a gas sensor (Co2), and a thermo camera.

<2-3. Information Processing Device 100>

The information processing device 100 includes an interface (I/F) unit 110, a gesture detection unit 120, a user detection unit 130, an environment detection unit 140, a device detection unit 150, a storage unit 160, and a control unit 170.

I/F Unit 110

The I/F unit 110 is a connection device for connecting the information processing device 100 and other devices to each other. For example, the I/F unit 110 is realized by a universal serial bus (USB) connector or the like, and performs input/output of information between respective constituent elements of the output device 200 and the sensor device 300.

Gesture Detection Unit 120

The gesture detection unit 120 has a function of detecting user's gesture information on the basis of information that is sensed by the sensor device 300. For example, the gesture information can be detected by a depth camera, a thermo camera, an RGB camera, an ultrasonic sensor, or the like. For example, the gesture information is on user's hand movement, arm movement, posture (for example, bone information), line of sight, touch operation, and the like. More specifically, the gesture detection unit 120 detects an operation of indicating a direction by pointing, head movement, a line of sight, or the like, and a touch operation on a projection location such as a wall, a floor, a table, other furniture, or the like as gesture information. The touch operation is detected as an operation input by a user with respect to a display image projected to the wall, the floor, the furniture, or the like. For example, in a case where the display image 10 is displayed on the table 30, the gesture detection unit 120 acquires a position or depth information (in other words, three-dimensional information) of a hand or a finger of a user which is located on a display screen by analyzing a captured image or depth information which is input from the sensor device 300, and detects contact or approaching of the user's hand with respect to the table 30, and detachment of the hand from the table 30 in a height direction. In this specification, a state in which the user causes an operating body such as a hand to come into contact with or to approach an information display screen is simply referred to as "contact".

The gesture detection unit 120 outputs detected gesture information to the control unit 170.

User Detection Unit 130

The user detection unit 130 has a function of detecting information relating to a user (user information) on the basis of information that is sensed by the sensor device 300.

The user information may include information indicating a user's position and the number of users in a space that is sensed by the sensor device 300. The user's position and the number of users can be detected by a thermo camera, an RGB camera, an infrared sensor, an ultrasonic sensor, or the like.

The user information may include information indicating a user's line of sight. The information indicating the user's line of sight includes information indicating a position of a visual point and a line-of-sight direction. In addition, the information indicating the user's line of sight may be information indicating a direction of a user's face or head, or information indicating a direction of an eyeball. The information indicating the user's line of sight can be detected by analyzing an image of user's eyes which is obtained by an RGB camera, an infrared camera, or an eyepiece camera worn by a user.

The user information may include information indicating a user's posture. The information indicating the user's posture can be detected by analyzing an image obtained by an RGB camera, an infrared camera, or the like.

The user information may include information indicating a user's uttered voice. The information indicating the user's uttered voice can be detected by analyzing voice information obtained by a microphone.

The user detection unit 130 outputs the detected user information to the control unit 170.

Environment Detection Unit 140

The environment detection unit 140 has a function of detecting environmental information on the basis of information that is sensed by the sensor device 300. The environmental information is information relating to a space in which a user exists. The environmental information may include various pieces of information.

The environmental information may include information indicating a shape of the space in which the user exists. For example, the information indicating the shape of the space includes information indicating a shape of an object such as a wall surface, a ceiling, a floor, a door, furniture, and livingwares which form the space. The information indicating the shape of the space may be two-dimensional information, or may be three-dimensional information such as a point cloud. For example, the information indicating the shape of the space can be detected on the basis of depth information obtained by infrared distance measurement, ultrasonic distance measurement, or a stereo camera.

The environmental information may include information indicating a state of a projection surface. For example, the state of the projection surface represents unevenness and a color of the projection surface. For example, the unevenness of the projection surface can be detected on the basis of depth information obtained by an LiDAR. For example, the color of the projection surface can be detected by analyzing an image that is captured by an RGB camera.

The environmental information may include information indicating brightness of the projection surface. The brightness of the projection surface can be detected by an illuminance sensor or an RGB camera.

The environmental information may include information indicating a position (three-dimensional position) of an object in a space. For example, positions of a cup, a chair, a table, an electronic device, and the like in a chamber can be detected through image recognition. In addition, for example, a position of a smart phone in the chamber can be detected by radio wave intensity relating to communication between the smart phone and an access point of a wireless LAN.

The environmental information may include an environmental sound. The environmental sound can be detected by a microphone.

An example of the environmental information that can be detected by the environment detection unit 140 is illustrated in the following Table 1. As objects detected by the environment detection unit 140, objects such as a wall and a floor which do not move (objects of which positions do not vary), objects such as furniture and a door which do not move frequently (objects of which positions do not vary frequently), and objects such as livingwares which move frequently (objects of which positions vary frequently) are assumed. With respect to the immovable objects or the objects which do not move frequently, environmental information detected for the first time may be stored and used, and with respect to the objects which move frequently, a latest state may be periodically detected.

TABLE 1

| Target type | Environmental information |
|---|---|
| Room (immovable) | Position and shape of wall, Position and shape of floor, Position and shape of ceiling, and the like |
| Objects which do not move frequently | Position and shape of furniture, Open/close of door, Large object, and the like |
| Objects which move frequently | Position and shape of mug cup, Position and shape of magazine, Position and shape of remote controller, and the like |
| Environmental sound | Environmental sound level in room |
| Environmental light | Environmental light map in room |

The environment detection unit 140 outputs the detected environmental information to the control unit 170.

The device detection unit 150 has a function of detecting information (device information) relating to a device in a space. The device information may include existence of the device and a three-dimensional position of the device.

The information processing device 100 is connected to each device (output device 200) through the I/F unit 110. For example, the I/F unit 110 is connected to the device in a space by wireless/wired local area network (LAN), digital living network alliance (DLNA) (registered trademark), Wi-Fi (registered trademark), Bluetooth (registered trademark), USB connection, other dedicated lines, or the like. The device detection unit 150 understands existence of the device with connection of the device through the I/F unit 110.

A three-dimensional position of the device can be specified on the basis of information that is sensed by the sensor device 300. For example, the device detection unit 150 may extract a retroreflective material provided in the device through analysis of an infrared image captured by an infrared (IR) camera of the sensor device 300, and may specify a position of the device in a space. In addition, the device detection unit 150 may extract a specific pattern (a manufacturer name, a two-dimensional barcode, or the like) provided in the device through analysis of a captured image captured by a camera (RGB camera) of the sensor device 300, and may specify a position of the device in a space. In addition, the device detection unit 150 may acquire a unique ultrasonic wave transmitted for every device by a microphone of the sensor device 300 and may specify a position of the device in a space. In addition, the device detection unit 150 may sense a location designation operation (pointing, touch, a line of sight, placing of a marker, or the like) by a user, and a registration operation (UI selection, voice utterance, or the like) by the sensor device 300, and may specify the position of the device in the space.

The device detection unit 150 outputs the detected device information to the control unit 170.

Hereinbefore, the function of detecting information relating to a person, an environment, and a device in a space has been described. In this specification, detection of various pieces of information by the gesture detection unit 120, the user detection unit 130, the environment detection unit 140, and the device detection unit 150 corresponds to space recognition, and obtained information (a result of environment sensing processing of the space) is also referred to as spatial information.

Control Unit 170

The control unit 170 controls whole operations in the information processing device 100 in accordance with various programs. The control unit 170 includes a display control unit 171, a sound control unit 173, and an analysis unit 175. The display control unit 171 controls display by the output device 200. The sound control unit 173 controls voice output by the output device 200.

The analysis unit 175 performs analysis of an operation by a user on the basis of spatial information (gesture information, user information, environmental information, and device information) obtained through space recognition. Specifically, the analysis unit 175 acquires voice utterance corresponding to a processing command of control relating to a location in a space, and in a case where the acquired voice utterance does not include words (for example, the name of a specific location) that specifies a location in the space, the analysis unit 175 determines the location in the space in the processing command on the basis of a result of environment sensing processing of the space by a plurality of kinds of sensors. For example, the analysis unit 175 converts a demonstrative pronoun included in the voice utterance into determination information on the basis of voice information, gesture information, and a position of an object in the space. The processing command of control relating to a location in the space is a processing command for executing any control (for example, output control) at the location in the space.

In addition, the control unit 170 specifies an utterer. Since positions or postures of all users in a space are periodically recognized by the user detection unit 130 and the environment detection unit 140, in the case of acquiring a voice signal of a certain volume or higher by a microphone, the control unit 170 specifies a direction of an utterer by using a microphone array, and specifies the utterer with reference to positions of all users which are recognized in advance.

In addition, the control unit 170 recognizes uttered content of the user. For example, the control unit 170 acquires a character string from voice information (uttered voice) collected by the microphone 330 by using a voice recognition engine, and performs syntax analysis to detect a trigger of a user's operation. The trigger of the user's operation may be a predetermined keyword (for example, the name of a system, call to the system, or the like) or a verb included in the processing command, for example, "move", "display", "show", or the like. In a case where the trigger is detected, the control unit 170 performs analysis of the user's operation by the analysis unit 175.

In addition, the control unit 170 performs control of issuing the processing command of the control relating to the location in the space on the basis of the location determined by the analysis unit 175. Specifically, the control unit 170 outputs the processing command of the control relating to the location in the space to the output device 200 through the I/F unit 110. For example, the control unit 170 issues a processing command for moving the display image 10 displayed on the table 30 to a projection location (for example, a wall) designated by the user to the projector 210.

Storage Unit 160

The storage unit 160 is realized by a read only memory (ROM) that stores a program, an operation parameter, or the like which can be used in processing by the control unit 170, and a random access memory (RAM) that temporarily stores parameters and the like which appropriately vary. In addition, the storage unit 160 stores the gesture information detected by the gesture detection unit 120, the user information detected by the user detection unit 130, the environmental information detected by the environment detection unit 140, the device information detected by the device detection unit 150, and the like.

Hereinbefore, the configuration of the information processing device 100 according to this embodiment has been described in detail. Note that, the configuration of the information processing device 100 is not limited to the example illustrated in FIG. 2. For example, the information processing device 100 may exist in the same space as in the output device 200 and the sensor device 300, and may exist in a different space. In addition, the information processing device 100 may exist on a network. In addition, a configuration of at least a part of the information processing device 100 may exist in an external device. When respective configurations of the information processing device 100 are appropriately distributed, it is possible to secure improvement of a real-time property, reduction of a processing load, and security.

3. Operation Processing

Figure 3:
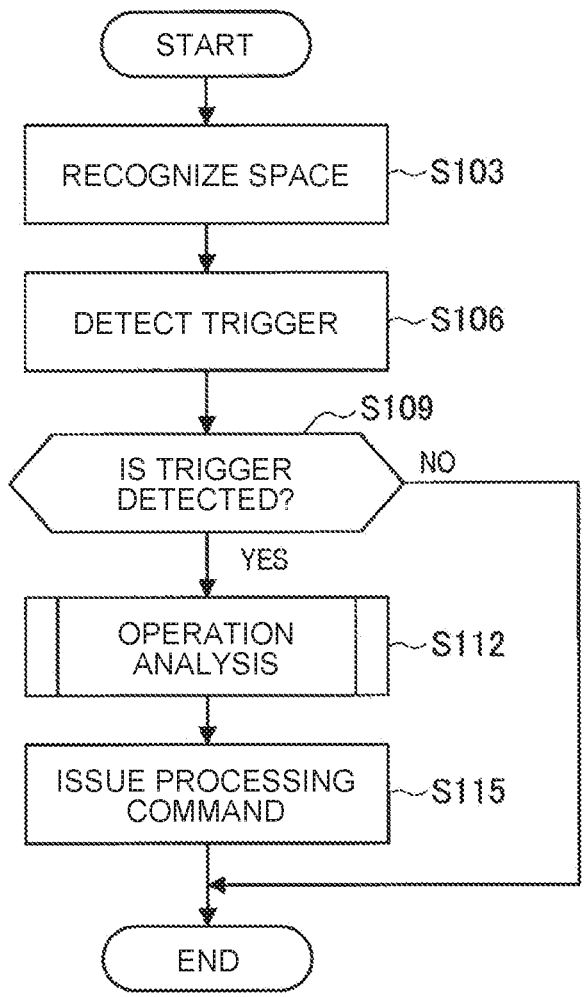
FIG. 3 is a flowchart illustrating an example of a flow of information processing that is executed by the information processing system according to this embodiment.
Figure 4:
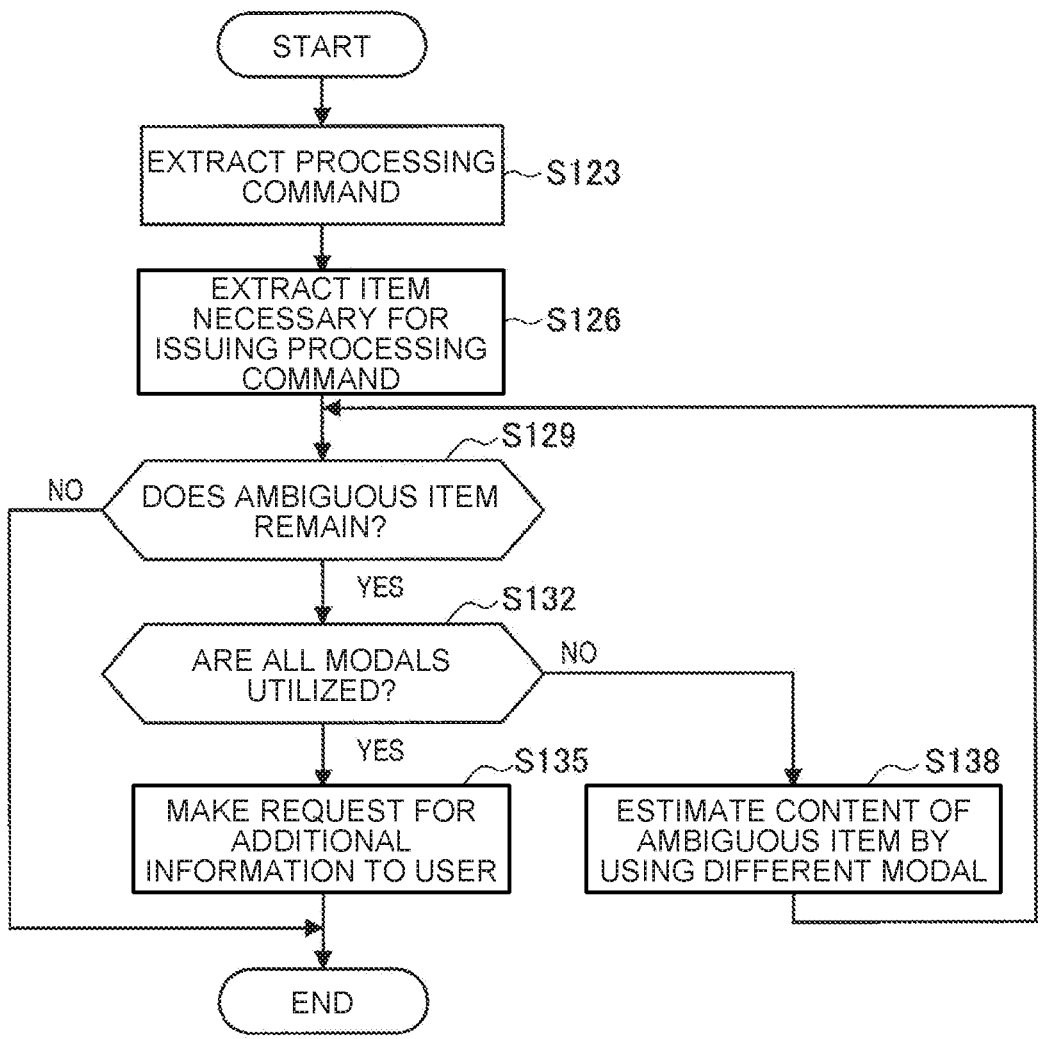
FIG. 4 is a flowchart illustrating an example of a flow of operation analysis processing illustrated in FIG. 3.

Next, an example of a flow of guidance processing according to this embodiment will be described with reference to FIG. 3 and FIG. 4. FIG. 3 is a sequence diagram illustrating an example of a flow of processing executed in respective units of the information processing device 100 of the system 1 according to this embodiment. FIG. 4 is a view illustrating an example of a flow of operation analysis processing executed in the system 1 according to this embodiment.

As illustrated in FIG. 3, first, the information processing device 100 performs space recognition by the gesture detection unit 120, the user detection unit 130, the environment detection unit 140, and the device detection unit 150 (Step S103). The space recognition is periodically performed.

Here, the control unit 170 of the information processing device 100 performs trigger detection of a user's operation on the basis of information obtained through the space recognition (Step S106). The trigger detection is performed by extraction of a predetermined keyword (for example, the name of a system, call to the system, or the like) from an uttered voice or a verb of a processing command. For example, in a case where a user utters "move this there", the control unit 170 extracts "move" through voice recognition and syntax analysis, and detects a trigger of a MOVE command.

Next, in a case where the trigger can be detected (Step S109/Yes), the analysis unit 175 of the information processing device 100 performs analysis of a user's operation (Step S112). The analysis unit 175 performs extraction of an item necessary for issuing of a processing command from the uttered voice, and in a case where an ambiguous item (an item of which a content cannot be specified) is present, the analysis unit 175 estimates and determines a content of the undetermined item on the basis of processing results (that is, spatial information) of sensing data acquired by a plurality of kinds of sensors such as voice information, gesture information, and environmental information. For example, a demonstrative pronoun ("this", "that", "it", or the like) included in the uttered voice is converted into determination information. Details of the operation analysis by this embodiment will be described later with reference to FIG. 4.

In addition, the control unit 170 performs control of issuing a processing command to a predetermined output device 200 (Step S115).

Next, the operation analysis processing by this embodiment will be described in detail. As illustrated in FIG. 4, the control unit 170 of the information processing device 100 extracts a processing command from an uttered voice (Step S123), and performs extraction of an item necessary for issuing the processing command (Step S126). Specifically, syntax analysis is performed with respect to a character string acquired through voice recognition of an uttered voice of a user as described above, and a MOVE command or a SHOW (OPEN) command is extracted on the basis of a verb such as "move" and "display".

Next, it is determined whether or not an ambiguous item remains in the processing command (Step S129). For example, the MOVE command is a command "move "operation target" to "movement destination"", and two pieces of determination information including the "operation target" and the "movement destination" are necessary to execute the command. However, for example, in a case where the uttered voice of the user includes a demonstrative pronoun in the "operation target" or the "movement destination" like "move this there", the demonstrative pronoun is not specific determination information, and thus it is determined that the ambiguous item remains.

Next, in a case where the ambiguous item remains (Step S129/Yes), the analysis unit 175 confirms whether or not to utilize all modals (Step S132). The all modals represent respective sensors included in the sensor device 300. For example, extraction of a processing command from a processing result of voice information sensed by the microphone 330 is performed, and in a case where the ambiguous item is included, another modal, for example, the camera 310 or the depth sensor 320 is utilized.

Next, in a case where the all modals are not utilized (Step S132/No), the analysis unit 175 estimates a specific content of the ambiguous item by using a processing result of information sensed by a different modal (Step S138). For example, the analysis unit 175 estimates the content of the item (for example, a demonstrative pronoun) that is ambiguous in the voice utterance on the basis of the processing result of the information sensed by the camera 310 or the depth sensor 320, for example, gesture information (a pointing operation, a line of sight, a posture, a direction of a face, a touch operation, or the like).

Specifically, for example, in a case where the demonstrative pronoun is included in the uttered voice corresponding to a processing command uttered by a user, the analysis unit 175 converts the demonstrative pronoun into determination information on the basis of utterance time at which the user utters the demonstrative pronoun, and depth camera information at that time. Hereinafter, description will be made with reference to FIG. 5.

Figure 5:
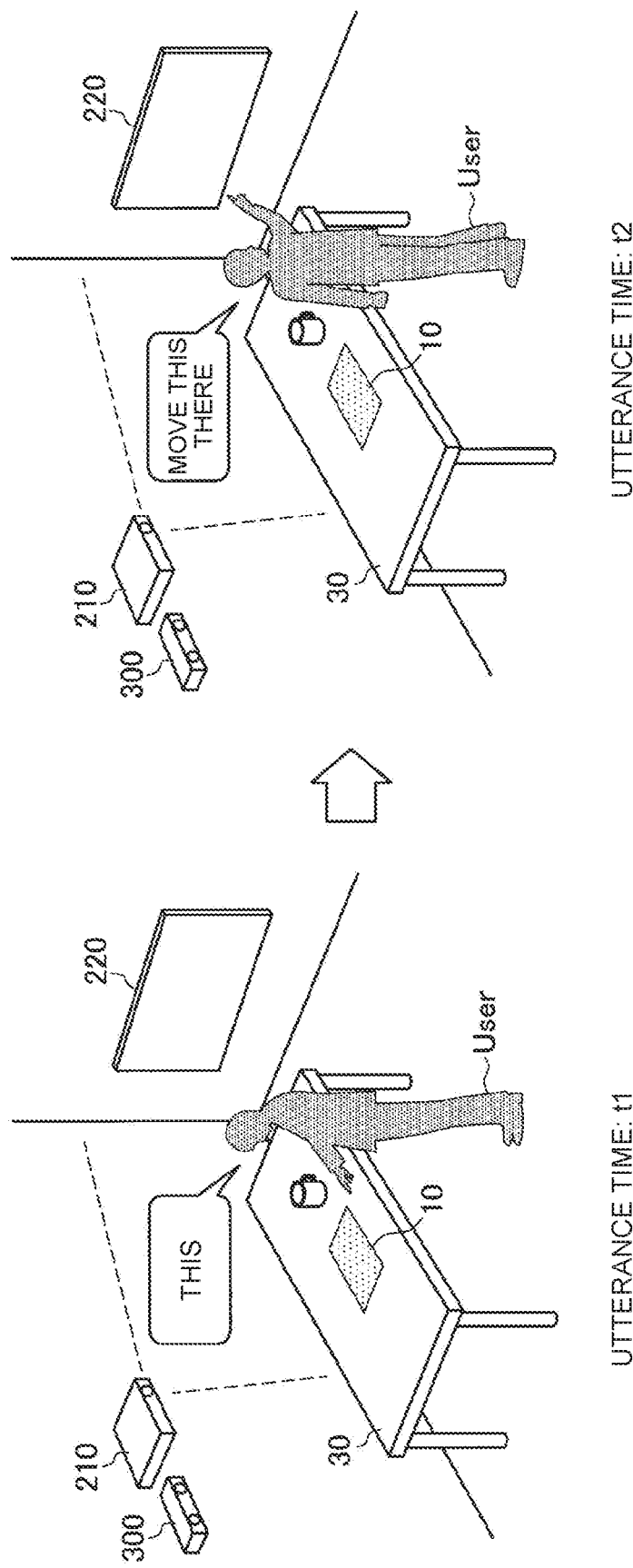
FIG. 5 is a view describing an example of a method of estimating a content of an ambiguous item of a processing command by utilizing a different modal according to this embodiment.

FIG. 5 is a view describing an example of a method of estimating the content of the ambiguous item in the processing command by utilizing a different modal according to this embodiment. As illustrated in FIG. 5, the user utters an utterance voice "move this there" corresponding to the processing command, the analysis unit 175 acquires time t1 at which the included demonstrative pronoun of "this" is uttered, and time t2 at which "there" is uttered. In this stage, as illustrated in the following Table 2, the "operation target" and the "movement destination" which are items necessary for issuing the MOVE command are in an ambiguous state.

TABLE 2

| MOVE command | | | |
|---|---|---|---|
| | Determination information | Demonstrative noun | Utterance time |
| Operation target | Undetermined | "This" | t1 |

TABLE 2-continued

| MOVE command | | | |
|---|---|---|---|
| | Determination information | Demonstrative noun | Utterance time |
| Movement destination | Undetermined | "There" | t2 |

Figure 6:
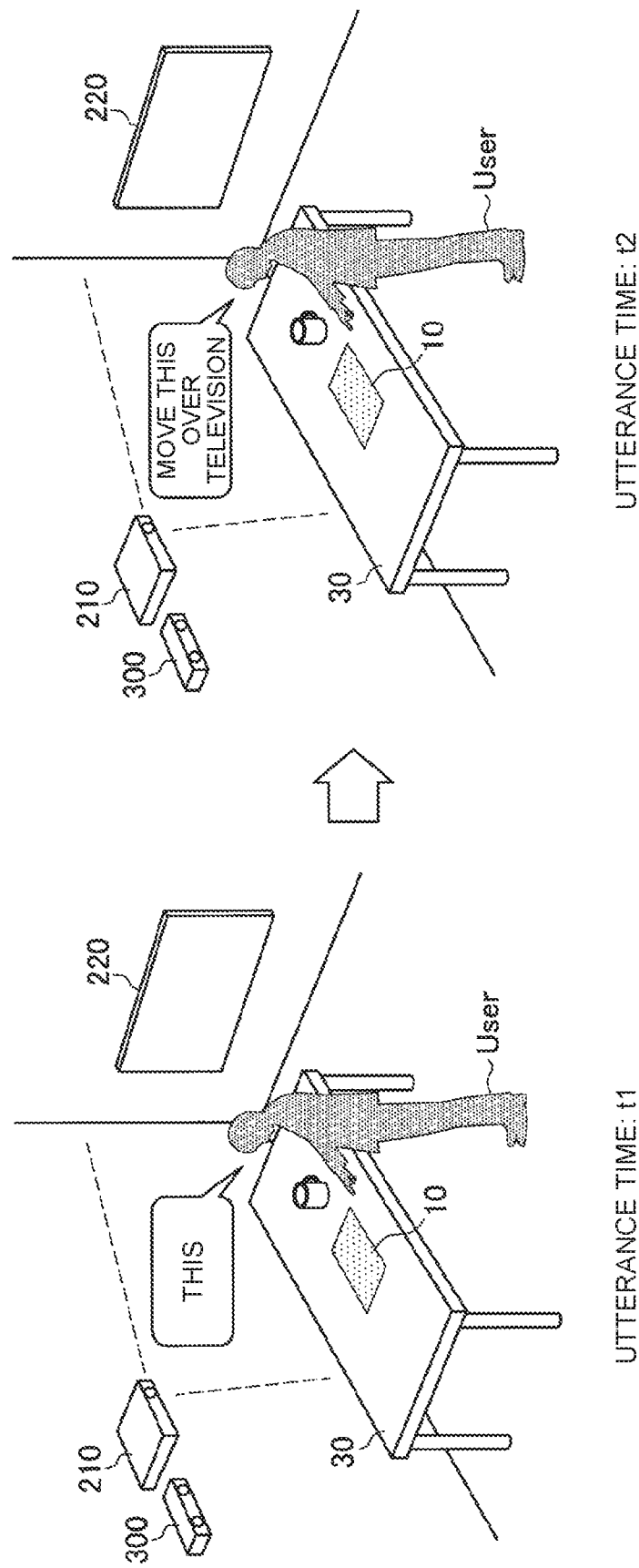
FIG. 6 is a view illustrating an example of a case where a movement destination among items of the processing command is specifically uttered according to this embodiment.

Note that, as illustrated in FIG. 6, in a case where a user utters "move this over the television", as the determination information of the movement destination in the MOVE command, "a wall surface over a television" is registered as illustrated in the following Table 3. In this case, the operation target is indication of "this", and thus processing of converting the demonstrative pronoun into determination information is performed on the basis of depth camera information at time t1 at which the user utters the demonstrative pronoun.

TABLE 3

| MOVE command | | | |
|---|---|---|---|
| | Determination information | Demonstrative pronoun | Utterance time |
| Operation target | Undetermined | "This" | t1 |
| Movement destination | Wall surface over television | "Over Television" | t2 |

Next, a method of estimating an ambiguous item in a situation illustrated in FIG. 5 will be described in detail. The analysis unit 175 acquires depth camera information at time t1 at which the user utters "this" in the utterance of the processing command (it is assumed that the depth camera information is stored in the storage unit 160 for approximately several tens of seconds from the past), and extracts a user's pointing direction at the time t1 from the acquired depth camera information. In addition, in a case where a movable target (for example, the display image 10 in the example illustrated in FIG. 5) exists in a fingertip direction, the target is set as determination information of an "operation target" item. Extraction of the pointing direction may be performed by the gesture detection unit 120. That is, the analysis unit 175 may acquire user's gesture information (pointing operation) detected by the gesture detection unit 120 on the basis of the depth camera information at the time t1 at which "this" is uttered from the storage unit 160.

Similarly, the analysis unit 175 determines the "movement destination" from a user's pointing direction based on depth camera information at the time t2 at which "there" is uttered by the user in the utterance of the processing command. In the example illustrated in FIG. 5, the user points a wall surface over the TV 220 at the time t2 at which the user utters "there". Since positions of objects in the space are recognized in advance, the analysis unit 175 can analyze that the user points the wall surface over the TV 220 from a position of the wall and the position of the TV 220 in the space, and the user's pointing direction. In this manner, for example, in a case where the depth sensor information other than voice information is used, when the user utters "this", the display image 10 (for example, a map image provided by a map application) on the table 30 is pointed, and when "there" is uttered, a wall surface over the TV 220 is pointed. As a result, the analysis unit 175 can obtain determination information as in the following Table 4 as item information of the MOVE command.

TABLE 4

MOVE command

| | Determination information | Demonstrative pronoun | Utterance time |
|---|---|---|---|
| Operation target | Map image by map application | "This" | t1 |
| Movement destination | Wall surface over television | "There" | t2 |

Note that, in the example illustrated in FIG. 5, the pointing operation by the user is detected from the depth sensor information, and the user's pointing direction is acquired. However, this embodiment is not limited to thereto, and another "operation of pointing a direction" such as a direction of a face, head movement, and a line-of-sight direction of the user, and the like may be detected.

As described above, it is possible to estimate the determination information of the ambiguous item in the uttered processing command by using processing results of a plurality of pieces of data sensed by a plurality of kinds of sensors (that is, through multi-modal sensing). Even in voice utterance that does not include the name of a specific location in a manner of speaking like a natural dialogue between human beings, it is possible to give an instruction for control relating to a location in a space.

On the other hand, in a case where an ambiguous item is present, but all modals are already utilized (Step S129/Yes, Step S132/Yes), the information processing device 100 makes a request for additional information to a user (Step S135). For example, the information processing device 100 may output a question such as "where is "there"?" to the user.

Hereinbefore, the operation analysis processing according to this embodiment has been described in detail.

The information processing device 100 transmits a processing command obtained by the above-described processing to the output device 200 that performs processing. For example, in the example illustrated in FIG. 5, the MOVE command obtained by the above-described processing as illustrated in Table 4 is transmitted to the projector 210, and the display image 10 is moved to a location designated by the user. FIG. 7 is a view illustrating an example of movement of a display image in accordance with issuing of the MOVE command.

Figure 8:
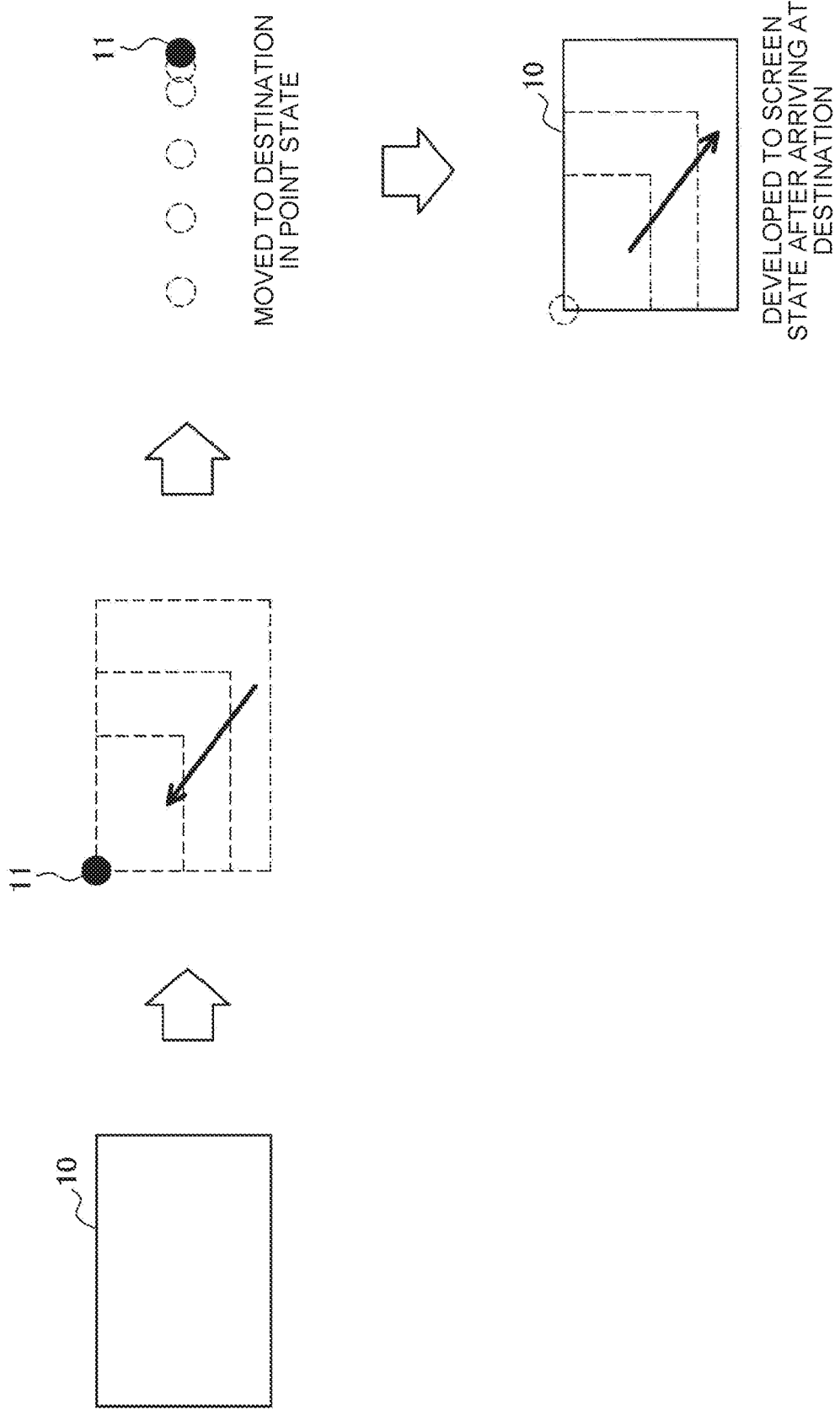
FIG. 8 is a transition view illustrating a variation of a shape in movement of the display image according to this embodiment.

As illustrated in FIG. 7, the projector 210 having received the MOVE command performs control of moving the display image 10 on the table 30 to a wall surface over the TV 220 which is designated by the user. At this time, the projector 210 may move the display image 10 from the table 30 to the wall surface over the TV 220 as is, or may move the display image 10 after changing the display image 10 to a predetermined shape such as a point, a mark, an icon, a character, or other figures at once. FIG. 8 is a transition view illustrating a variation of the shape in movement of the display image 10.

As illustrated in FIG. 8, for example, the projector 210 may perform control of changing the display image 10 to a point shape at once, moving the display image 10 to a destination such as a wall surface over a television in a point state, and developing the point to the display image 10 again after arriving at the destination. According to this, the user can visually follow where the display image 10 moves according to an instruction of the user.

In addition, in a case where the display image 10 is moved to the wall surface, it is highly likely that the user browses the display image 10 from a distant position, and thus the projector 210 may perform control of displaying the display image 10 in correspondence with the position of the user or in a predetermined display size that is set. Specifically, for example, in the case of displaying the display image 10 on a wall surface, the projector 210 performs control of displaying the display image 10 in a size larger in comparison to a case where the display image 10 is displayed on the table 30. According to this, even in a case where the user is distant from the wall surface, it is possible to secure visibility of the display image 10.

Hereinbefore, the operation processing according to this embodiment has been described in detail. Note that, the operation processing illustrated in FIG. 3 and FIG. 4 is illustrative only, and the present disclosure is not limited to the example illustrated in FIG. 3 and FIG. 4. For example, the present disclosure is not limited to the sequence of steps illustrated in FIG. 3 and FIG. 4. At least any one step may be processed in parallel, or may be processed in an opposite sequence. For example, the space recognition processing in Step S103 may be periodically performed in parallel to all the other kinds of processing.

In addition, it is not necessary for all kinds of the processing illustrated in FIG. 3 and FIG. 4 to be performed. For example, the trigger detection processing illustrated in Step S106 and Step S109, the processing of confirming utilization of all modals illustrated in Step S132, or the addition information request processing illustrated in Step S135 may be skipped.

In addition, it is not necessary for all kinds of processing illustrated in FIG. 3 and FIG. 4 may be performed by a single device.

4. Modification Example

Continuously, a modification example of this embodiment will be described.

The information processing device 100 may feedback recognition of the processing command to a user with a sound, light, or the like. For example, as illustrated in FIG. 5, when the user utters "move this there", the information processing device 100 may perform control of making a sound while illuminating a recognized object or location with the projector 210 at the moment when the demonstrative pronoun is uttered. Specifically, the information processing device 100 performs control of making a sound of "rin" while illuminating the display image 10 that is being pointed by the user with the projector 210 at the moment when the user utters "this", and making a sound of "rin" while illuminating a wall surface over the TV 220 which is being pointed by the user with the projector 210 at the moment when "there" is uttered. For example, the control can be realized by the information processing device 100 performing ambiguous item estimation processing, as needed, by utilizing another modal, for example, with reference to the gesture information in a case where a demonstrative pronoun is included in an uttered voice of the user when the user utters the name of the system and a trigger is detected. Through the feedback, the user can intuitively understand that an operation by the user is recognized by the system, and can use the system with more assurance.

In addition, information that is used when specifying a location may be a touch operation of directly touching the location without limitation to the "pointing gesture". For example, in a case where the user utters "put a television remote control (remote controller) here" while touching a table, the information processing device 100 determines a display location as the "table" on the basis of the touch operation of the user when a demonstrative pronoun of "here" is uttered. In addition, a SHOW (OPEN) command of "display target: television remote control (UI)", and "display location: table" is issued to the projector 210.

In addition, even in a case where the user utters while omitting the demonstrative pronoun, the information processing device 100 can issue the processing command by performing estimation of an ambiguous item. For example, in a case where the user utters "television remote control" while touching a table, the information processing device 100 determines a display location as the "table" on the basis of the touch operation, and issues the SHOW command for displaying a television remote control UI on the table to the projector 210.

In addition, similarly, in a case where the user utters "search for ginger-baked recipe" while touching the table, the information processing device 100 extracts a SEARCH command from the word "search", and determines the "ginger-baked recipe" as a search target and determines the "table" as a search result display location from the touch operation of the user, and issues the SEARCH command. Specifically, the information processing device 100 transmits a processing command for displaying a search screen of the "ginger-baked recipe" on the table to the projector 210.

In addition, even in a case where the user simply utters "put it here" (in a case where the user utters an utterance voice including an ambiguous display/movement location by a demonstrative pronoun while omitting an operation target), the information processing device 100 can estimate the operation target and the display/movement location by utilizing another modal, and can convert the ambiguous item into determination information. For example, the information processing device 100 extracts a MOVE command from the word "put", determines a location closer to an utterer (for example, a projection location in front of an eye of the utterer) from the demonstrative pronoun of "here" as the movement destination, and determines a line-of-sight direction of the user as the operation target. For example, in a case where the user utters "put it here" while viewing a program table image displayed (projected) on a wall, the information processing device 100 specifies the program table image which the user views as the operation target, and moves the program table image onto a table in front of the eye of the user.

In addition, in a case where the user simply utters "put it on a wall", the information processing device 100 may set a UI that has been operated immediately before by the user as the operation target. For example, in a case where the user has performed touch input with respect to a memo image that is provided by a memo application and is displayed (projected) onto a table immediately before the user utters, the information processing device 100 determines the memo image as the operation target and moves the memo image to a wall designated by the user.

In addition, in a case where the user utters "show a map here" while reading a magazine, the information processing device 100 recognizes an article of the magazine which the user is viewing by analyzing a captured image acquired by the camera 310, and may display (project) a map image corresponding to the article in the vicinity of the user. For example, the information processing device 100 searches for a map image of a location on the basis of a region name, a facility name, a name of a tourist spot, or the like which is included in the article, and displays the map image in the vicinity of the user.

In addition, in a case where a user designates another user who is in a space by uttering "pass it to Mr. OO", the information processing device 100 determines a projection location in the vicinity of a position of the other user who is understood through space recognition as the movement destination. In addition, the information processing device 100 may determine, for example, a UI that has been operated by the user immediately before the user's utterance as the movement target. In addition, when the UI is moved, the information processing device 100 may perform display control on another designated user so that the UI is directed to the front.

In addition, for example, the processing command may be a processing command for controlling ON/OFF of illumination by an illumination device (an example of the output device 200) without limitation to the MOVE command, the SHOW command, the SEARCH command, and the like. For example, in a case where the user utters "turn on the electricity", the information processing device 100 issues a Light_ON command. Specifically, the information processing device 100 may determine, for example, an illumination device (for example, a light bulb_ID-5) that exists in a direction pointed by the user on the basis of a user's gesture when the user utters "the electricity".

TABLE 5

| Light_ON command | | | |
|---|---|---|---|
| | Determination information | Demonstrative pronoun | Utterance time |
| Operation target | Light bulb_ID_5 | "The electricity" | t1 |

5. Hardware Configuration

Figure 9:
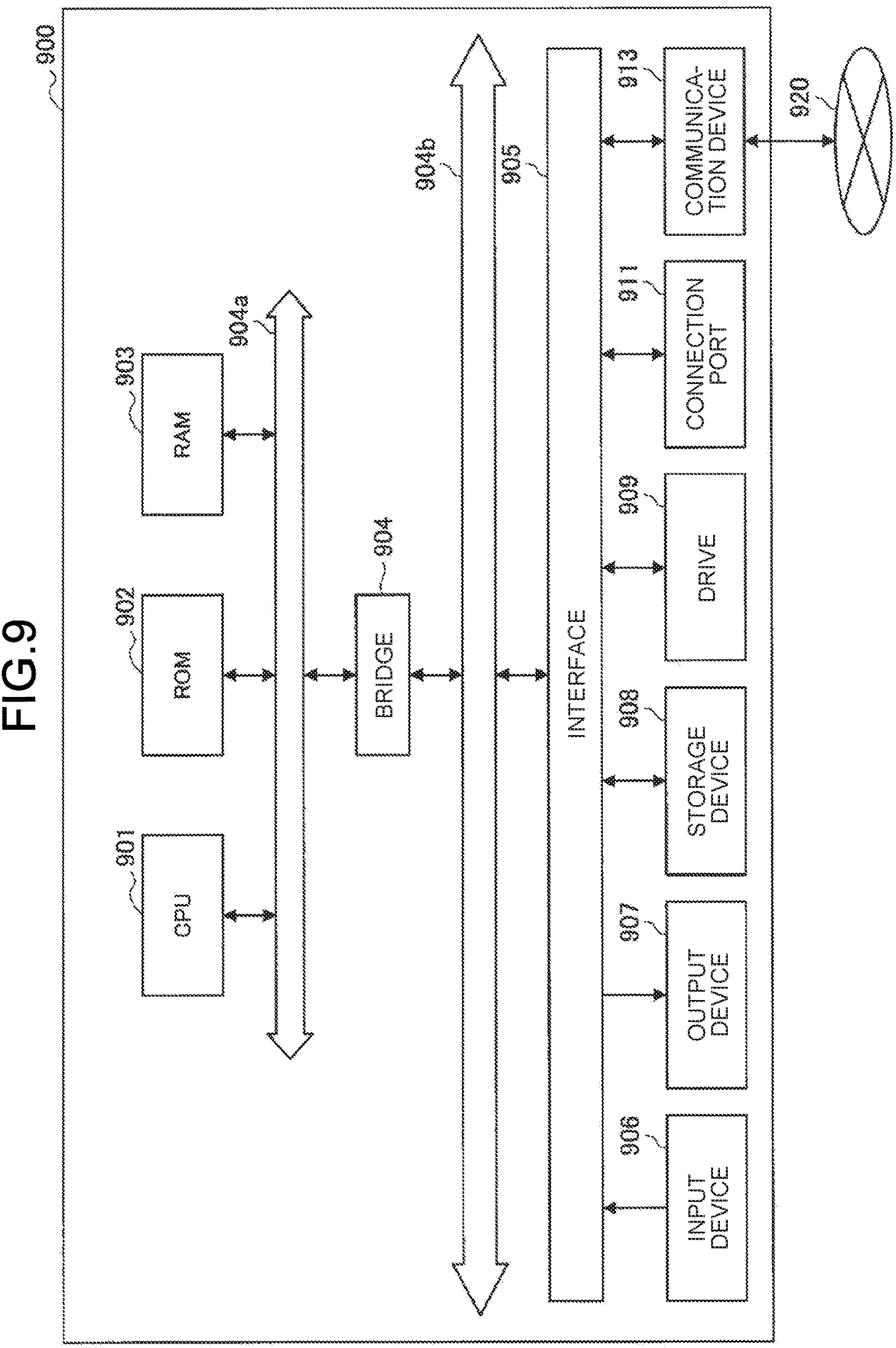
FIG. 9 is a block diagram illustrating an example of a hardware configuration of the information processing device according to this embodiment.

Finally, a hardware configuration of the information processing device according to this embodiment will be described with reference to FIG. 9. FIG. 9 is a block diagram illustrating an example of the hardware configuration of the information processing device according to this embodiment. Note that, an information processing device 900 illustrated in FIG. 9 can realize, for example, the information processing device 100 illustrated in FIG. 2. Information processing by the information processing device 100 according to this embodiment is realized by cooperation of software and hardware to be described below.

As illustrated in FIG. 9, the information processing device 900 includes a central processing unit (CPU) 901, a read only memory (ROM) 902, a random access memory (RAM) 903, and a host bus 904a. In addition, the information processing device 900 includes a bridge 904, an external bus 904b, an interface 905, an input device 906, an output device 907, a storage device 908, a drive 909, a connection port 911, and a communication device 913. The information processing device 900 may include a processing circuit such as an electric circuit, a DSP, or an ASIC instead of or in combination with the CPU 901.

The CPU 901 functions as an operation processing device and a control device, and controls overall operations in the information processing device 900 in accordance with various programs. In addition, the CPU 901 may be a microprocessor. The ROM 902 stores a program that is used by the CPU 901, operation parameters, and the like. The RAM 903 temporarily stores a program that is used in execution of the CPU 901, parameters which appropriately vary in the execution, and the like. For example, the CPU 901 can form the gesture detection unit 120, the user detection unit 130, the environment detection unit 140, the device detection unit 150, and the control unit 170 illustrated in FIG. 2.

The CPU 901, the ROM 902, and the RAM 903 are connected to each other by the host bus 904a including a CPU bus and the like. The host bus 904a is connected to the external bus 904b such as a peripheral component interconnect/interface (PCI) bus through the bridge 904. Note that, the host bus 904a, the bridge 904, and the external bus 904b are not necessary to be separately constituted, and functions thereof may be mounted in one bus.

For example, the input device 906 is realized by a device such as a mouse, a keyboard, a touch panel, a button, a microphone, a switch, and a lever to which information is input by a user. In addition, for example, the input device 906 may be a remote control device using infrared rays or other radio waves, or may be an external connection device such as a portable telephone and a PDA which corresponds to an operation of the information processing device 900. In addition, for example, the input device 906 may include an input control circuit or the like which generates an input signal on the basis of information input by the user by using the input unit and outputs the input signal to the CPU 901. The user of the information processing device 900 can input various pieces of data to the information processing device 900 or can give an instruction for the information processing device 900 to perform a processing operation by operating the input device 906.

The output device 907 is formed as a device capable of visually or audibly notifying the user of acquired information. Examples of the device include display devices such as a CRT display device, a liquid crystal display device, a plasma display device, an EL display device, a laser projector, an LED projector, and a lamp, voice output devices such as a speaker and a headphone, a printer device, and the like. For example, the output device 907 outputs a result obtained by various kinds of processing performed by the information processing device 900. Specifically, the display device visually displays results obtained by the various kinds of processing performed by the information processing device 900 in various formats such as a text, an image, a table, and a graph. On the other hand, the voice output device converts an audio signal composed of reproduced voice data, sound data, or the like into an analog signal, and audibly outputs the analog signal.

The storage device 908 is a data storage device that is formed as an example of a storage unit of the information processing device 900. For example, the storage device 908 is realized by a magnetic storage unit device such as an HDD, a semiconductor storage device, an optical storage device, a magneto-optical storage device, or the like. The storage device 908 may include a storage medium, a recording device that records data on the storage medium, a reading-out device that reads out data from the storage medium, and a deletion device that deletes data recorded on the storage medium. The storage device 908 stores a program that is executed by the CPU 901, various pieces of data, various pieces of data obtained from the outside, and the like. For example, the storage device 908 can form the storage unit 160 illustrated in FIG. 2.

The drive 909 is a reader/writer for the storage medium, and is embedded in the information processing device 900 or is attached thereto from the outside. The drive 909 reads out information recorded on a removable storage medium such as a magnetic disk, an optical disc, a magneto-optical disc, a semiconductor memory, or the like which is mounted, and outputs the information to the RAM 903. In addition, the drive 909 can write information on the removable storage medium.

The connection port 911 is an interface that is connected to the external device, and examples thereof include a connection port with the external device that can transmit data by, for example, a universal serial bus (USB) or the like. For example, the connection port 911 can form the I/F unit 110 illustrated in FIG. 2. In addition, the connection port 911 is connected to the output device 200 and the sensor device 300 illustrated in FIG. 2.

For example, the communication device 913 is a communication interface that is formed by a communication device or the like for connection to a network 920. Examples of the communication device 913 include a communication card for wired or wireless local area network (LAN), long term evolution (LTE), Bluetooth (registered trademark), or wireless USB (WUSB), and the like. In addition, the communication device 913 may be a router for optical communication, a router for asymmetric digital subscriber line (ADSL), a modem for various kinds of communication, or the like. For example, the communication device 913 can transmit and receive a signal or the like to and from the Internet or other communication devices on the basis of a predetermined protocol such as TCP/IP. For example, the communication device 913 can form the I/F unit 110 illustrated in FIG. 2. In addition, the communication device 913 can perform communication with the output device 200 and the sensor device 300 illustrated in FIG. 2.

Note that, the network 920 is a wired or wireless transmission path of information transmitted from devices connected to the network 920. For example, the network 920 may include a public line network such as the Internet, a telephone line network, and a satellite communication network, various local area networks (LANs) including Ethernet (registered trademark), wide area network (WAN), and the like. In addition, the network 920 may include a dedicated line network such as an Internet protocol-virtual private network (IP-VPN).

Hereinbefore, an example of the hardware configuration capable of realizing the functions of the information processing device 900 according to this embodiment has been described. Each of the above-described components may be realized by using a general-purpose member, or may be realized by hardware specialized for the function of each component. Therefore, it is possible to appropriately change the hardware configuration to be used according to the technical level at the time of carrying out this embodiment.

In addition, a computer program for realizing each function of the information processing device 900 according to this embodiment as described above can be created and mounted on a PC or the like. In addition, a computer-readable recording medium in which the computer program is accommodated can be provided. Examples of the recording medium include a magnetic disk, an optical disc, a magneto-optical disc, a flash memory, and the like. In addition, the above-described computer program may be distributed, for example, through a network without using the recording medium.

6. Summary

As described above, in the information processing system according to the embodiment of the present disclosure, even in a voice utterance that does not include the name of a specific location, it is possible to give an instruction for control relating to a location in a space.

Hereinbefore, a preferred embodiment of the present disclosure has been described in detail with reference to the accompanying drawings, but the present disclosure is not limited to the examples. It should be understood by those skilled in the art that various modification examples or various variation examples can be made in the scope of the technical sprite described in the appended claims, and the examples are also included in the technical scope of the present disclosure.

For example, it is also possible to create a computer program for causing the hardware such as the CPU, the ROM, and the RAM mounted in the information processing device 100, the output device 200, or the sensor device 300 to exhibit the functions of the information processing device 100, the output device 200, or the sensor device 300. In addition, a computer-readable storage medium storing the computer program is also provided.

Each of the respective devices described in this specification may be realized as a single device, or a part or the whole may be realized as a separated device. For example, the information processing device 100, the output device 200, and the sensor device 300 illustrated in FIG. 2 may be constituted as a single device. In addition, for example, the information processing device 100 illustrated in FIG. 2 may be constituted as a server device that is connected to the output device 200 and the sensor device 300 with a network. In addition, among functional configuration examples of the information processing device 100 illustrated in FIG. 2, the control unit 170 may be provided in a device such as a server that is connected to the I/F unit 110, the gesture detection unit 120, the user detection unit 130, the environment detection unit 140, a device detection unit 150, and the storage unit 160 with a network.

In addition, it is not necessary for the processing described with reference to the flowcharts in this specification to be executed in the sequence illustrated in the drawing. Several processing steps may be executed in parallel. In addition, an additional processing step may be employed, and a partial processing step may be omitted.

In addition, the effect described in this specification is illustrative only, and is not limited. That is, the technology according to the present disclosure can obtain other effects which are apparent for those skilled in the art from the description of this specification in combination with or instead of the above-described effect.

Note that, the present technology can employ the following configurations.

(1)

An information processing device comprising:

a control unit that acquires voice utterance corresponding to a processing command of control relating to a location in a space, determines the location in the space in the processing command on the basis of a result of environment sensing processing of the space by a plurality of kinds of sensors in a case where the acquired voice utterance does not include a word that specifies the location in the space, and performs control of issuing a processing command of control relating to the location in the space on the basis of the determined location.

(2)

The information processing device according to (1), wherein the control unit determines the location in the space in the processing command on the basis of a demonstrative pronoun that is extracted from the result of the environment sensing processing of the space and relates to a location included in the voice utterance, and an operation of giving an instruction for a direction by an utterer when the demonstrative pronoun is uttered.

(3)

The information processing device according to (1), wherein the control unit determines the location in the space in the processing command on the basis of an operation of specifying a location by an utterer when voice utterance that is extracted from the result of the environment sensing processing of the space and corresponds to the processing command is uttered.

(4)

The information processing device according to any one of (1) to (3), wherein the plurality of kinds of sensors include at least one among a microphone, a depth sensor, and a camera sensor.

(5)

The information processing device according to any one of (1) to (4), wherein the processing command is movement of a display image to the determined location, display of a predetermined image at the determined location, or control of a device that is located at the determined location.

(6)

The information processing device according to (5), wherein the control unit, determines a processing target on the basis of a demonstrative pronoun that is extracted from the result of the environment sensing processing of the space and relates to a processing target in the processing command included in the voice utterance, and an operation of an utterer who utters the demonstrative pronoun, and performs control of issuing the processing command on the basis of the determined location and the processing target.

(7)

The information processing device according to (6), wherein the processing target is a display image that is displayed in the space.

(8)

The information processing device according to (5), wherein the control unit determines a processing target in the processing command on the basis of an operation of an utterer until uttering voice utterance that is extracted from the result of the environment sensing processing of the space and corresponds to the processing command.

(9)

The information processing device according to (8), wherein the control unit determines a display image in a line-of-sight direction of the utterer or a display target that is being operated as the processing target.

(10)

The information processing device according to any one of (1) to (9), wherein in a case where the acquired voice utterance includes a word that specifies the location in the space, the location in the space in the processing command is determined on the basis of the word that specifies the location in the space.

(11)

An information processing method executed by a processor, the method comprising:

acquiring voice utterance corresponding to a processing command of control relating to a location in a space;

determining the location in the space in the processing command on the basis of a result of environment sensing processing of the space by a plurality of kinds of sensors in a case where the acquired voice utterance does not include a word that specifies the location in the space; and performing control of issuing a processing command of control relating to the location in the space on the basis of the determined location.

(12)

A program causing a computer to function as a control unit that acquires voice utterance corresponding to a processing command of control relating to a location in a space, determines the location in the space in the processing command on the basis of a result of environment sensing processing of the space by a plurality of kinds of sensors in a case where the acquired voice utterance does not include a word that specifies the location in the space, and performs control of issuing a processing command of control relating to the location in the space on the basis of the determined location.

REFERENCE SIGNS LIST

1 SYSTEM
10 DISPLAY IMAGE
100 INFORMATION PROCESSING DEVICE
110 I/F UNIT
120 GESTURE DETECTION UNIT
130 USER DETECTION UNIT
140 ENVIRONMENT DETECTION UNIT
150 DEVICE DETECTION UNIT
160 STORAGE UNIT
170 CONTROL UNIT
171 DISPLAY CONTROL UNIT
173 SOUND CONTROL UNIT
175 ANALYSIS UNIT
200 OUTPUT DEVICE
210 PROJECTOR
220 TV
230 TABLET
240 SMART PHONE
250 PC
260 SPEAKER
270 UNIDIRECTIONAL SPEAKER
300 SENSOR DEVICE
310 CAMERA
320 DEPTH SENSOR
330 MICROPHONE

The invention claimed is:

1. An information processing device, comprising:
a control unit configured to:
   acquire a voice utterance that corresponds to a first processing command of a control process, wherein
      the control process is associated with a specific location in a specific space, and
      a word that specifies the specific location is absent from the voice utterance;
   execute an environment sensing process based on spatial information associated with the specific space, wherein the spatial information is acquired by a plurality of sensors;
   determine the specific location in the specific space based on:
      a result of the execution of the environment sensing process, and
      the voice utterance; and
   output a second processing command of the control process based on the specific location,
      wherein the second processing command of the control process is associated with one of:
         a first process that corresponds to movement of a display image to the specific location,
         a second process that corresponds to display of a specific image at the specific location, or
         a third process that corresponds to control of a specific device at the specific location.

2. The information processing device according to claim 1, wherein
the voice utterance includes a demonstrative pronoun that corresponds to the specific location in the specific space, and
the control unit is further configured to:
   extract determination information based on each of:
      the demonstrative pronoun,
      the result of the execution of the environment sensing process, wherein the determination information corresponds to the specific location; and
   determine an operation associated with output of an instruction for a specific direction, wherein the operation is determined based on utterance of the demonstrative pronoun.

3. The information processing device according to claim 1,
wherein the control unit is further configured to:
   extract the voice utterance based on the result of the execution of the environment sensing process,
      wherein the voice utterance is associated with an operation of specification of the specific location in the specific space; and
   determine the specific location in the specific space based on the determined operation of the specification of the specific location.

4. The information processing device according to claim 1,
wherein the plurality of sensors includes at least one of a microphone, a depth sensor, or a camera sensor.

5. The information processing device according to claim 1, wherein
the first processing command is associated with a processing target of the control process, and
the control unit is further configured to:
   extract a demonstrative pronoun based on the result of the execution of the environment processing;
   determine the processing target based on:
      the demonstrative pronoun, and
      an utterer operation; and
   control the output of the second processing command based on each of the specific location and the processing target.

6. The information processing device according to claim 5,
wherein the processing target is the display image displayed in the specific space.

7. The information processing device according to claim 1, wherein
the first processing command is associated with a processing target of the control process, and
the control unit is further configured to:
   extract an utterer operation based on the result of the execution of the environment sensing process; and
   determine the processing target based on the utterer operation.

8. The information processing device according to claim 7,
wherein the control unit is further configured to determine one of:

the display image in an utterer line-of-sight direction, or a display target that corresponds to the processing target.

9. An information processing method, comprising:

acquiring a voice utterance that corresponds to a first processing command of a control process, wherein
the control process is associated with a specific location in a specific space, and
a word that specifies the specific location is absent from the voice utterance;

executing an environment sensing process based on spatial information associated with the specific space, wherein the spatial information is acquired by a plurality of sensors;

determining the specific location in the specific space based on:
a result of the execution of the environment sensing process, and
the voice utterance; and outputting a second processing command of the control process based on the specific location,
wherein the second processing command of the control process is associated with one of:
a first process that corresponds to movement of a display image to the specific location,
a second process that corresponds to display of a specific image at the specific location, or
a third process that corresponds to control of a specific device at the specific location.

10. A non-transitory computer-readable medium having stored thereon computer-executable instructions which, when executed by a computer, cause the computer to execute operations, the operations comprising:

acquiring a voice utterance that corresponds to a first processing command of a control process, wherein
the control process is associate with a specific location in a specific space, and
a word that specifies the specific location is absent from the voice utterance;

executing an environment sensing process based on spatial information associated with the specific space, wherein the spatial information is acquired by a plurality of sensors;

determining the specific location in the specific space based on:
a result of the execution of the environment sensing process, and
the acquired voice utterance; and outputting a second processing command of the control process based on the specific location, wherein the second processing command of the control process is associated with one of:
a first process that corresponds to movement of a display image to the specific location,
a second process that corresponds to display of a specific image at the specific location, or
a third process that corresponds to control of a specific device at the specific location.

* * * * *